UNITED STATES PATENT OFFICE 2,425,004

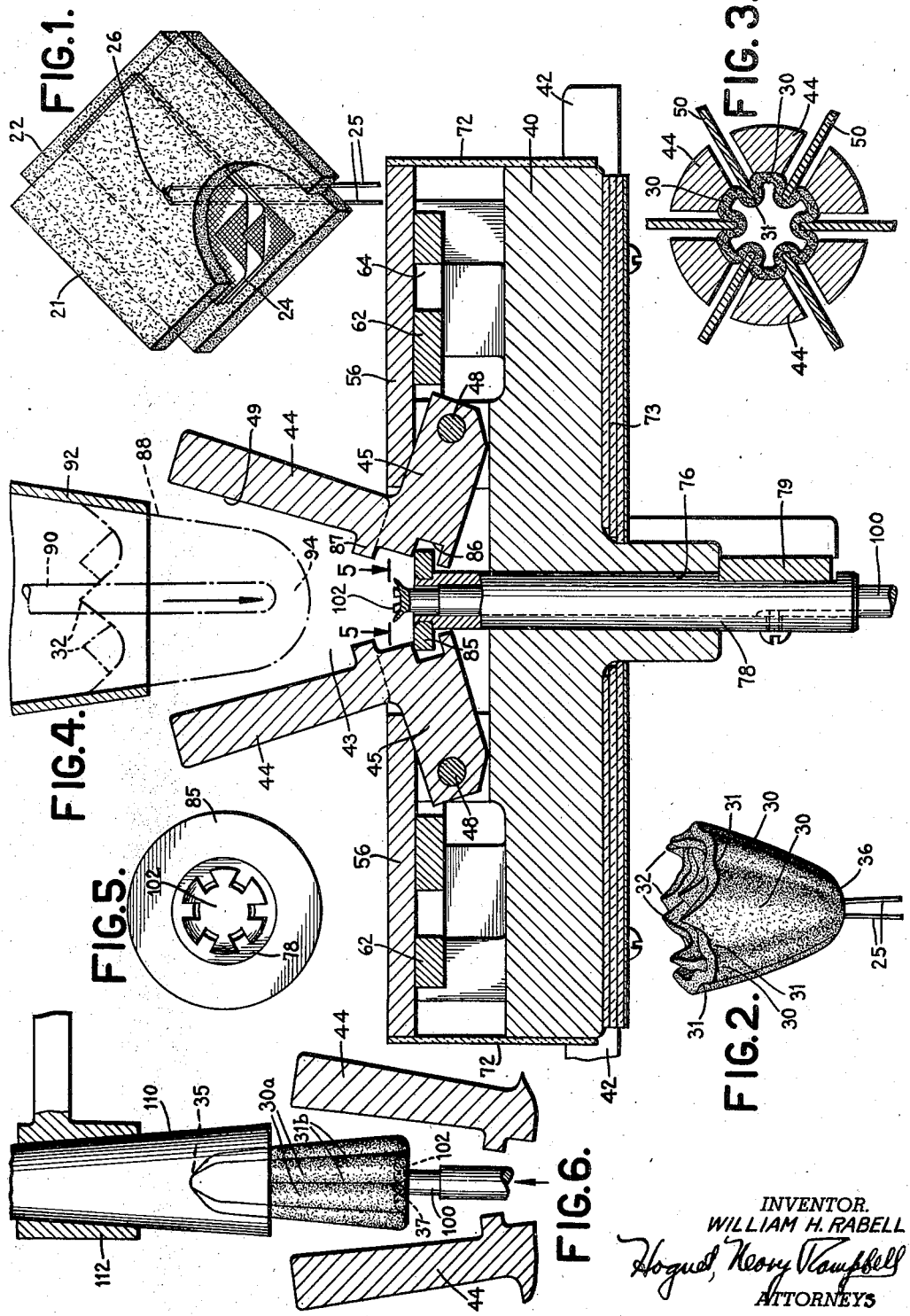

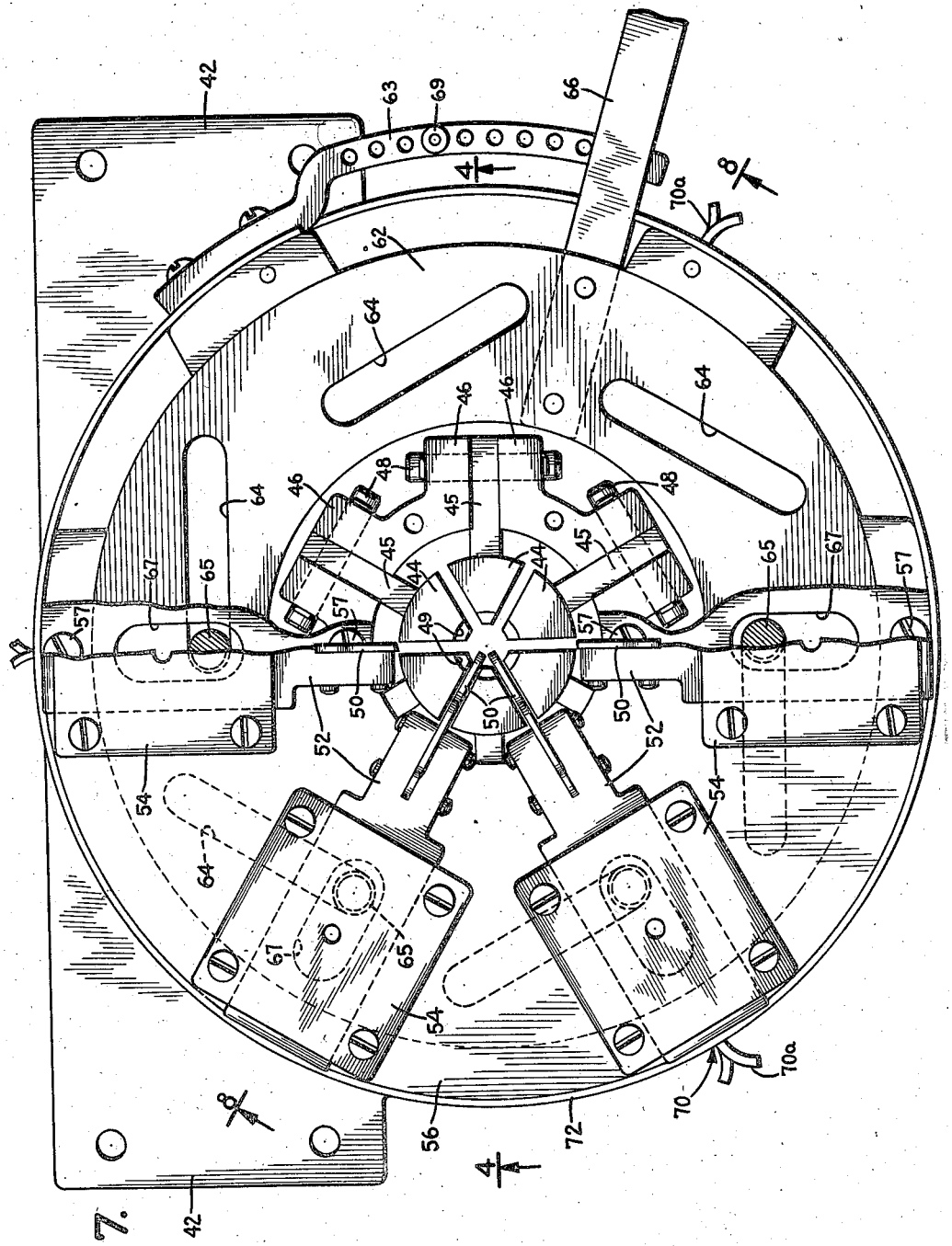

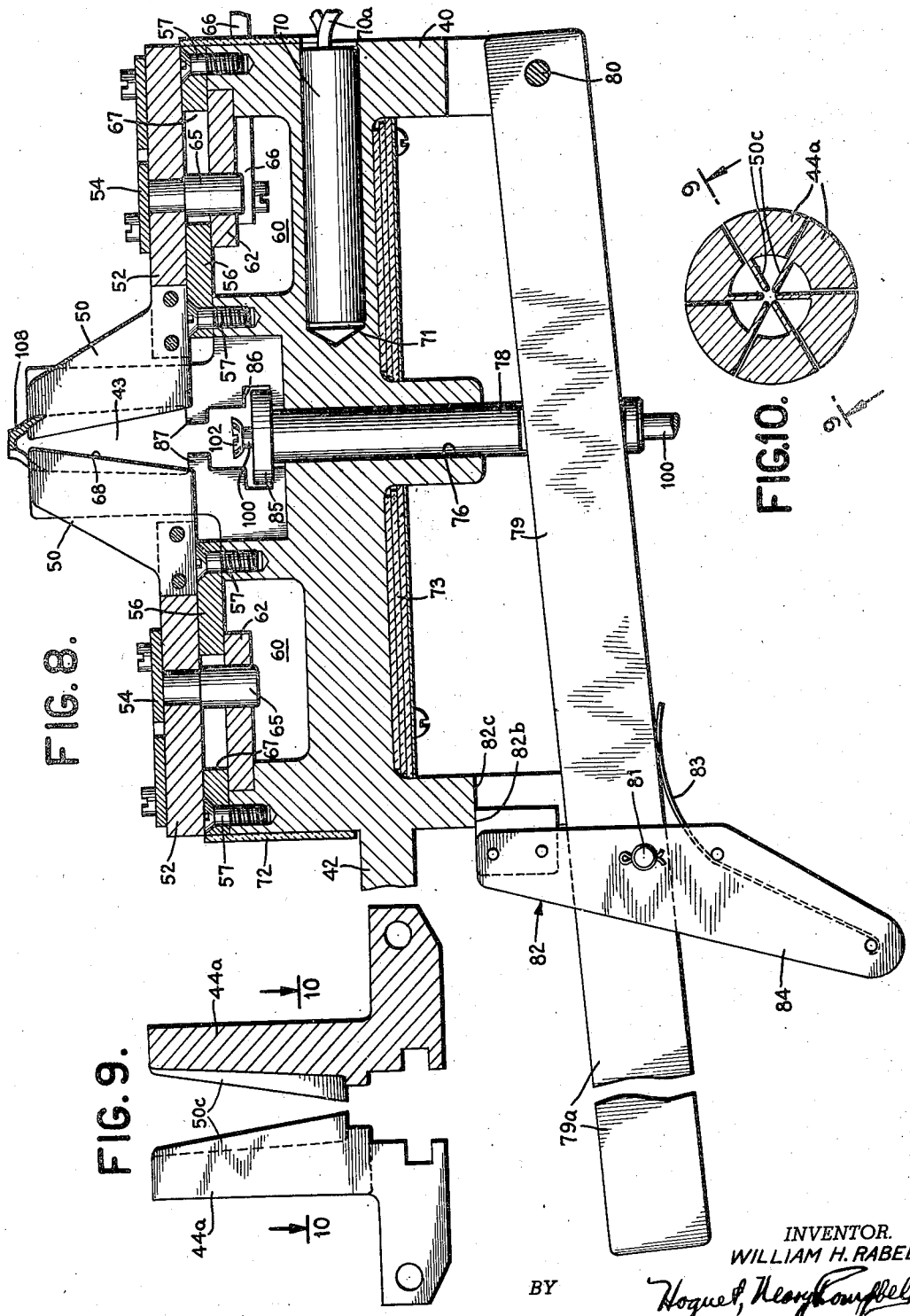

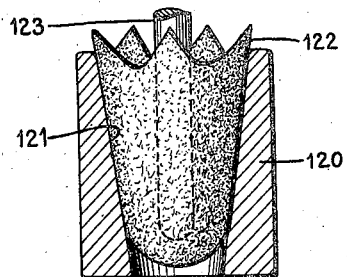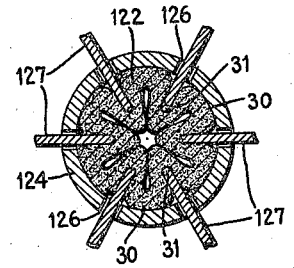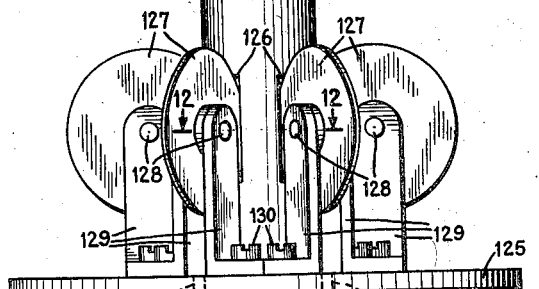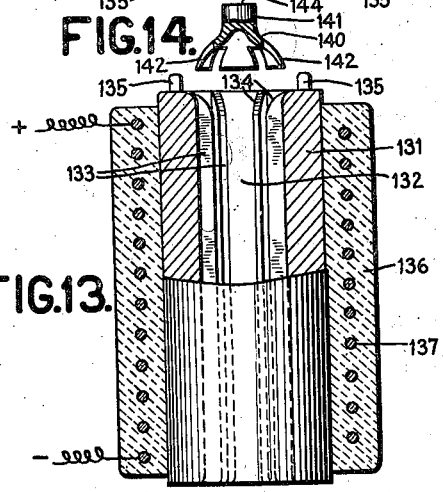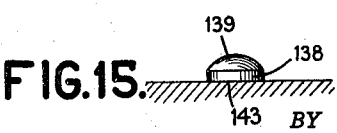

METHOD OF AND MACHINE FOR MAKING TAMPONS

William H. Rabell, Fitchburg, Mass.

Application June 2, 1942, Serial No. 445,519

27 Claims. (Cl. 18—5)

The present invention relates to methods and apparatuses for forming absorbent tampons that are adapted for insertion into body cavities such as the vaginal canal for the absorption and retention of fluid secretions.

The tampons which may be made by the methods and machines of the invention are described more particularly in an application of Miriam E. Rabell, Serial No. 445,520, filed June 2, 1942. In that application the tampon is described as being made of absorbent sheet material which may comprise a single piece of material or laminations thereof of various shapes and sizes and which is pursed up and folded together around the central portion thereof. The folds of the pursed material are preferably disposed along lines spaced apart and extending longitudinally of the pursed portion and the material is compressed laterally of the pursed portion resulting in a semi-compressed body substantially cylindrical or conical in shape, the base thereof being soft and the tapered body being progressively firmer toward the apex end thereof.

The tampon has a fluted shape having curved surface sections and grooves of compressed material extending radially towards the center between the curved surface portions. The exposed surfaces are in a semi-compressed state so that the surface retains the softness and resiliency characteristic of the uncompressed cotton from which the tampon is preferably formed.

The tampon has a substantially continuous surface of uncompressed soft material of immediate and maximum absorptive value, although the total mass of material confined by compression within the final volume of the tampon is relatively great. The undulations in the material which are apparent to a considerable extent on the surface of the tampon itself, provide a greater area for absorption than would be the case if the outer surface were truly circular such as would result from more or less uniform compression over the entire circumferential surface.

The tampon has a substantially cylindrical or conical pointed shape and the base portion has an indentation which is suitable to accommodate the finger nail and the tip of the finger of the user, and also to receive therein for packaging a withdrawal cord attached to the material.

The tampon, when moistened, expands radially rather than longitudinally, and is therefore comfortable and safe, and presents a cup-like receptacle for fluid reception and retention.

It is an object of the invention to provide methods of and apparatuses for producing economically the tampon as described heretofore.

In accordance with the method, sheet absorbent material is pursed into a cup-like shape having a plurality of undulations around the periphery as a result of gathering the flat material into the pursed condition. In this form the material is subject to compressive forces adapted to impart shape retaining properties. These forces are primarily in a transverse or radial direction with a minimum of compression laterally, i. e., the direction of the axis of the pursed material. The compressive forces on the outside of the pursed material are small so as to leave the surface in a relatively soft and uncompressed state. The primary compressive forces are applied only at spaced isolated points around the periphery of the pursed material and in lines extending throughout the length of the pursed material. This compression is such as to compress the inner undulations, so that the resulting tampon is radially compressed and semi-shape retaining, but nevertheless is soft on the exposed surface areas.

To render the material at least partially shape retaining, the material may be heated during the compression thereof. This heating of the material may be performed by associating heating elements with the die or the compressing elements thereof. Depending on the humidity and the temperature, the heating of the material, which may comprise mostly of cotton, requires a very short period.

The exact temperatures to which the material is to be heated, and the temperature of the compressing die if this method of heating is used, will vary depending on the speed of the operation, the humidity, the properties of the material being treated, etc. It is not possible to give exact limits. Merely as illustrative, a suitable temperature range for the compressing elements may be anywhere between about 180° F. and 350° F. The material may be heated to a temperature of 150° F. upwards as long as it is not injured. It has been found that if cotton is brought to a temperature of from about 160° F. to 180° F., a large portion of the normal moisture contained in cotton will be removed. The removal of the residual moisture of the material seems to be a factor which contributes to partially shape retaining properties, that is to say, shape retaining in the more firmly compressed portion of the body so that a reasonable time is allowed for wrapping and packaging in a shape retaining wrapper or package, and also for use after the wrapper is removed.

Machines of various forms may be provided to manufacture the tampon of the present invention. Generically, the machine should include means for initially pursing and folding the sheet material. The means for initially pursing and folding the material may be separate from the compressing die or may constitute a part thereof. The pursing and folding means and/or compressing means, as the case may be, should preferably provide a circularly arranged surface or surfaces for reception of the material, Associated with the circularly arranged surfaces are a plurality of radially disposed inwardly extending blades, flanges or wheels to fold the material along lines spaced apart and extending longitudinally of the pursed portion thereof. The shaping and compressing means may be movable, or they may be fixed and the material moved relative to them.

The compressing die may be heated by suitable means or the body of material after it has been compressed may be placed in a shape retaining member and while so retained subjected to heat. The tampon may then be suitably wrapped, as in "Cellophane" for shipment.

Many variations of the pursing and compressing means are possible, for example, the compressing means may comprise die elements which are adapted to either oscillate or reciprocate radially against the material. The folding blades or flanges may be separate from the die elements or constitute integral parts thereof. In addition, other forms of pursing and compressing members may include a hollow cylindrical and/or tapered member into which the material can be forced by a plunger or by other means such as may utilize air pressures and be engaged by rotary members or rifling ribs suitably disposed on the inner surface of the hollow member to produce the desired folding and compressing effects.

For a better understanding of the invention, reference may be had to the following detailed description to be read in connection with the accompanying drawings, in which:

Figure 1 is a view in perspective of three rectangular pieces of sheet material which form together a laminated body suitable for the manufacture of the tampon of the present invention;

Figure 2 is a perspective view of the material in pursed condition prior to compressing;

Figure 3 is a sectional view of a folding and compressing die illustrating diagrammatically the folding and compressing of pursed sheet material;

Figure 4 is a vertical sectional view taken substantially along line 4—4 of Fig. 7 with the blades removed to illustrate the open position of the die sectors and the feeding means for introducing a pursed material into the die for compression;

Figure 5 is a plan view of a part of the machine as viewed along line 5—5 of Figure 4;

Figure 6 is a vertical sectional view of the machine in opened position and illustrating the removal of the compressed tampon from the die to a wrapping device;

Figure 7 is a plan view of a machine with parts broken away operable to manufacture the tampon according to the method of the present invention;

Figure 8 is a vertical sectional view taken substantially along line 8—8 of Figure 7 to illustrate the relation of the folding blades with respect to the compression sectors of the die;

Figure 9 is a horizontal sectional view taken substantially along line 9—9 of Figure 10 showing a modified form of a compression die suitable for the manufacture of the tampon;

Figure 10 is a vertical sectional view of the die taken substantially along line 10—10 of Figure 9;

Figure 11 is a view in vertical elevation partly in section of a modified form of an apparatus suitable for manufacturing the tampon;

Figure 12 is a view in cross-section taken substantially along the line 12—12 of Figure 11;

Figure 13 is a vertical elevation partly in section of a member adapted to be used in connection with the apparatus shown in Figure 11;

Figure 14 is a vertical elevation of a member adapted to apply a conical apex to the tampon; and Figure 15 is a view in vertical elevation showing a shaping member for forming a concave indentation in the bottom of the tampon.

Referring to Figure 1 of the drawings a laminated body of sheet material is shown comprising two rectangular pieces 21 and 22 of soft absorbent material such as cotton batting having layered therebetween one or more thicknesses of gauze 24. The pieces 21 and 22 are longer in one dimension than the other so that when one piece is applied over the other with the long dimensions thereof at right angles, the ends of each piece extend beyond the side edges of the other piece and provide together eight distinct corners. This provides points forming the conical upper end on the tampon when pursed-up as described later. The gauze 24 interposed between the two layers of cotton may be of any suitable size and shape except that for best performance it should not extend beyond the outermost extremity of the cotton.

A suitable cord 25 may be looped through the central portion of the laminated body and a knot 26 may be tied in the looped portion so that when either end of the cord is pulled, the knot will engage and grip the material.

In place of using a laminated body of material as shown in Figure 1, a single piece of soft absorbent material may be used such as a rectangular piece, a circular piece, a triangular piece, or any other desired shape. If desired, two or more such pieces may be combined. Such pieces may or may not have gauze between them. Two equilateral triangular pieces may also be used in overlapping relation to provide six distinct corners, with or without gauze between them. A circular piece of gauze may be layered between two rectangular pieces of cotton of different size.

The shape of the soft absorbent material, whether rectangular, triangular, circular, or any other shape, is immaterial in accordance with the invention.

The piece or pieces of cotton batting and gauze, if the latter is used, may be cut from sheet material and assembled by hand or by any suitable machine for this purpose. The cord 25 is then preferably fixed in any desired manner, following which the blank in flat form, such as shown in Figure 1 is in form for the pursing-up and compressing operation.

The assembled sheet or sheets of material are then pursed-up and given the shape somewhat similar to that shown in Figure 2, with the central portion adjacent the string forming the bottom or base of the tampon and the edges of the sheet material forming the upper portion. The pursed-up tampon will have outer surface undulations 30 and inner folds or undulations 31. When a square or a triangular piece of material is used the corners of these pieces will form the points 32. This pursing-up may be accomplished by hand or by any suitable machine.

The material in this pursed-up form is then subjected to compression and heat as described heretofore preferably by means of blades or rollers 50 (Fig. 3) which are moved radially so as to compress and compact the material transversely. Preferably the radial compressing members are adapted to compress the material in the folds or inner undulations 31. In practice, if this is difficult, the compressing blades or rollers 50 may assist in forming and distributing the inner undulations. The shaping and compressing segments 44 may also force the outer undulations 30 radially although a relatively small amount of pressure is applied to the outer undulations 30 and the primary compression being accomplished by the thin radial blades 50.

The finished tampon is substantially shape retaining as illustrated in Figure 6. It is flute-like in contour and comprises the soft feeling curved surfaces 30a, the compressed portions 31b, the conical apex 35, and the indentation 37.

Following the formation of the tampon it may be placed in a wrapper, and tightly wrapped whereby its compressed shape is retained through the strength of the wrapper. The wrapper is also preferably moisture-proof, since the dehumidified cotton seems to retain its shape better in the dried state.

Referring to Figures 3 to 8 of the drawings, a machine is shown by which the sheet material may be pursed-up and compressed in accordance with the method of the present invention. The machine comprises a base 40 having flanges 42 by which it may be mounted on a suitable support. Circularly disposed upon the base 40 and defining a die chamber 43 are a plurality of sectors 44 each of which is provided with an extension 45 pivotally mounted between suitably shaped bearing members 46 carried by the base 40. The bearing members 46 are provided with apertures through which a pivot pin 48 is received and onto which the extension 45 is pivotally mounted. As shown in Figure 7, six sectors 44 are disposed in a circular arrangement whereby the sectors may be swung radially upward and outward to open the cooperating compression surfaces 49 thereof. While six sectors are shown, it will be understood, of course, that a greater or lesser number of sectors may be provided.

Disposed between adjacent sectors 44 are blades 50, each of which is held by a member 52 slidably mounted within a housing 54 secured to a cover plate 56 which overlies and is secured to the base 40 by studs 57. The base 40 is provided with an annular channel 60 within which is supported a cam ring 62. The cam ring 62 is provided with six cam slots 64 (Fig. 7) disposed at an angle crosswise of the ring to receive depending lugs 65 carried by the slidable members 52. The cover plate 56 has a plurality of radial slots 67 through which the lugs 65 extend. Secured to the ring 62 is an arm 66 by which the ring may be oscillated so that the cam slots 64 will cause the blades to move radially inward and outward of the die chamber 43. An adjustable stop comprising an apertured arm 68 and a shiftable peg 69 is provided on the base to limit the movement of the arm 66 and thereby determine the compressing action of the blades 50.

The die chamber 43 is frusto-conical in vertical elevation. That is to say, the material engaging surfaces 49 are inclined from the base of the chamber 43 inwardly toward the top thereof. Inwardly projecting base elements or fingers 87 define the bottom portion of the compression chamber 43.

The inner edges 68 of the blades 50 are inclined even at a greater angle than the surfaces 49. The inclinations of the surfaces 49 and the edges 68 insure the substantially conical shape of the tampon when removed from the die.

The sectors and blades are heated by transfer of heat from the base 40 which in turn is heated by electric heaters 70 (having electric cords 70a) contained within pockets 71. The sides and bottom of the base 40 are provided with a covering of insulation 72 and 73. While the heaters 70 are shown disposed within pockets contained within the base 40, it will be understood that they may be otherwise associated with the base, sectors and blades and, if desired, may be contained within cavities formed within the sectors 44.

Axially of the base 40 (Fig. 8) is a bore 76 through which a plunger 78 is adapted to be reciprocated by means of a lever 79 pivoted to the base at 80 and having a handle portion 79a. Pivoted at 81 on the lever 79 is a trigger 82 which has a surface 82b which engages under the surface 82c. The trigger is biased by a spring 83 to releasably lock the arm 79 in lowered position on the base 40. The upper end of the plunger 78 is provided with a circular flange 85 receivable within recesses 86 on the inner edges of the sectors 44. When it is desired to raise the plunger 78 to open the die chamber 43, the handle 84 is pressed inwardly of the base whereupon the surface 82b disengages the surface 82c and the lever 79 may be raised.

The plunger 78 is shown in raised position in Figure 4 whereby the die sectors 44 are pivoted outwardly to an open position for reception or removal of tampon material. As shown, the opened die is about to receive a body 88 of absorbent material which has been preliminarily pursed. A feeding plunger 90 engages the central portion 94 of one or more sheets of absorbent material such as shown in Figure 1 and forces it inwardly of a tubular member 92 which may be either cylindrical or tapered. The material thus forced into and through the member 92 is folded and pursed about the central portion 94 so that when the body of material 88 is delivered from the feeding member 92 it is received within the compression chamber 43 with the central or base portion 94 disposed at the base of the chamber.

The sectors 44 are now pivoted inwardly upon the pursed material by the downward movement of the plunger 78, the plunger being held down by the trigger 82 as indicated in Figure 8. The movement of the sectors 44 may be accompanied simultaneously or separately, either before or after, by an inward compressing movement of the blades 50, which is accomplished by movement of the arm 66. As the blades move inwardly of the surfaces 49 of the sectors 44 (see Fig. 3) they fold the sides of the absorbent material inwardly along equally spaced lines extending lengthwise of the pursed portion.

When the sectors and the blades reach their inner positions, the material is folded and compressed radially and with progressively greater force toward the upper end thereof. This gradient of the intensities of the compression forces is determined by the inclined engaging surfaces of the sectors and blades. Thus, while the base of the tampon is but slightly compressed, the upper end or apex portion thereof is tightly compressed and the body portion is compressed progressively firmer from the soft large end to the firm small or open end thereof. Thus, the resulting tampon may be described as semi-compressed.

The heaters 70 may be used to elevate the temperature of the sectors and blades to any suitable temperature depending, of course, upon the residual moisture of the cotton and the humidity of the surrounding air. The heat is concentrated in the base 40 and transferred by radiation and conduction to the chamber 43 and the surrounding sectors 44 and blades 50.

Axially of the plunger 78 is still another plunger 100 which is provided with a claw-like end 102 which is concave in plan as indicated in Figures 4, 5 and 6. This claw is adapted to be pressed upwardly past the finger 87 against the central or base portion 94 of the body 88 of the tampon to form therein an indentation 37 as indicated in Figure 6. The indentation 37 has two useful functions, one is to accommodate the finger nail or finger tip of the user and the other is to provide a pocket for the cord which may be coiled for packaging and shipment.

In order to insure a substantially conical apex 35 for the body 88, a hollow conical, slotted capping member 108 is provided for movement downwardly onto the upper end of the pursed material substantially as shown in Figure 8 whereby the upper edges and corners of the pursed material are compacted into a tight conical shape. The plunger 100 and the capping member 108 may be forced against the material while it is in radial compression within the compression chamber 43. This compression of the material along its length, however, is temporary only and does not affect appreciably the overall length of the tampon but merely forms the indentation 37 and provides a more definite conical shape 35 for the apex portion of the tampon.

As shown in Figure 6, the plunger 100 may also be utilized to expel the compressed body 88 from the chamber 43 and to force it into a suitable wrapper 110 brought to position over the die chamber by a wrapping device 112. The wrapper 110 is rolled and held in conical form for reception of the tampon. After the tampon has been received in the wrapper, the ends of the wrapper may be twisted or sealed.

The semi-compressed condition of the tampon as made by my method and machine insures that the fibers of the material of the base or central portion 36 are not broken or felted but remain unaffected by the shaping compressing operations. The uncompressed or unfelted condition of the fibers in the lower part of the tampon insures a hinge action since the fibers when released tend to return to substantially the flat sheet condition they were in before the pursing and compressing operations. Thus, when the wrapper is removed from the tampon and the tampon is permitted to expand, such as when the conical end portion becomes moistened, the material tends to open up radially as though hinged at the base thereof. This opening up characteristic of the tampon is illustrated in Figure 2.

In Figures 9 and 10 of the drawings, a form of die is shown wherein the blades 50c are formed integral with the sectors 44a. This combined sector and blade construction may be pivoted similarly as the sectors 44 or they may be arranged for reciprocating movement similar to blades 50. The inclination of the material engaging edges of the sectors 44a and the blades 50c is the reverse of the inclination of the surfaces 49 and 68 so that the small end of the compression chamber is at the bottom of the die. In this construction the feeding tube into which the material is preliminarily pursed is inverted for the feeding operation so that the pursed portion will enter downwardly into the die.

While the inclination of the material engaging surfaces of the combined sector and blade construction of Figures 9 and 10 is shown to be the reverse of the inclination of the die and blade surfaces 49 and 68, it will be understood that they may have the same inclination as the surfaces 49 and 68 if desired.

Referring to Figures 11 to 15 of the drawings, another form of method and machine are shown whereby the pursed-up conically shaped tampon of the present invention may be formed. This machine comprises a tubular member 120 which as shown has a tapered inner wall 121. This functions as the initial shaper and may be separate from or a part of the tube 124.

Material in a flat form, as shown in Figure 1, is forced by a plunger 123 into and downwardly through the shaper 120 to purse and partially compress the material, as shown at 122. This operation may be carried out by hand or by suitably operated automatic mechanism. The tube 120 may be located on top of the tube 124 during this operation or not.

The tube 124 is rigidly mounted upon a base 125 by any suitable means. Located around the periphery, near the bottom of tube 124, are a plurality of longitudinally extending slots 126. The number may be varied, but in the preferred embodiment, as illustrated, six slots are utilized. A plurality of discs 127, one corresponding to each slot, are mounted so that the periphery of the discs extends through the slots into the inner portion of the tube 124. The discs are mounted for rotation by means of pivots 128 in association with brackets 129 which are held on the base 125 by screws 130. The exact details of the construction are immaterial and the brackets 129 may be made integral with the base 125 if desired.

After the absorbent sheet material has been initially shaped, the tube 120 is disposed above the tube 124, unless, of course, the tubes 120 and 124 are a part of an integral structure. The plunger 123 is then moved downwardly to force the pursed material into the tube 124. As the material is moved downwardly through the tube 124 the pursed material engages the periphery of the discs 127 which extend into the tube 124, and by this means the inner undulations 31 are formed in the pursed material. As the material is pushed through the tube 124, the discs 127 rotate and progressively engage the full length of the pursed material.

In accordance with the method being described, the next step is performed preferably by means of a heated die member 131 which contains an inner hollow tubular portion 132 into which extend ribs 133. The ribs extend preferably throughout the length of the die member, and preferably are sloped at the top as indicated at 134. The ribs 133 correspond in number and relative position to the discs 127, and the heated die 131 and plate 125 contain interlocking elements 135 so that the tube 124 may be placed adjacent the die 131 with the ribs 133 in alignment with the discs 127.

When so aligned, the pursed and shaped material is forced downwardly from the tube 124 into the die 131. The inner undulations 31 formed by the discs 127 will be retained by the ribs 133.

Associated with the die 131 is a heating element 136 preferably heated by means of an electric resistance element 137.

After the material is positioned in the die 131 the die is separated from the plate 125 and placed on top of a bottom forming element 138 having a conical or a convex surface 139. In this position the surface 139 extends within the bottom of the tubular portion 132. An apex forming member 140 having a conical inner surface is then disposed within the top of the tubular portion 132 by means of plunger rod 141. The projections 142 are adapted to engage the spaces between the ribs 133. By forcing the plunger 141 downwardly into the heated die the bottom of the shaped material is forced against the convex surface 139 of the member 138 and the top of the material is forced into the inner conical surface of the shaper 140. By applying a longitudinal force, the material is formed with a concave indentation 37 (Fig. 6) to receive the finger tip, and the upper portions of the material are given the conical shape 35 (Fig. 6). The material may be permitted to remain in the heated die as long as desired, generally from a period of 2 to 30 seconds, and the die may be heated to a temperature within the range indicated heretofore.

The inner diameter of the tube 124 and the die 131 and the distance which the discs 127 and ribs 133 extend into the tubes are so arranged with reference to the amount of material to be compressed as to exert a strong radial compressing force, particularly upon the inner undulations 31. When so compressed the longitudinal force exerted by the plunger 141 is relatively small, and due to the highly compressed state of the material because of the radial compressing forces, very little, if any, longitudinal compression occurs as a result of the application of the shaping members 138 and 140.

In practice the die 131 may be made quite long, simulating a rifle barrel, but having the ribs 133 straight instead of curved. Such an elongated die may contain a number of shaped tampons which are moved progressively through it. The rate of movement and length of die will determine the time interval during which any one tampon remains within the heated die. In order to accomplish the end shaping, the member 138 may be located on top of the conical shaping member with the surface 143 abutting the surface 144. Such a combined top and bottom shaping member may be fed alternately with the shaped tampons into the elongated die and the force exerted to push the tampons through the die, with such end shaping means located alternately between them, will serve to accomplish the end shaping operations.

While the apparatus shown in Figures 11 to 15 has been illustrated and described as operated in a vertical direction, it is obvious that the operation may be carried out with the apparatus located horizontally or in any other position.

While different methods and machines have been described and illustrated, it is recognized that many variations in the methods disclosed and that many other machines and variations of those disclosed therein may be devised for the purpose of making the pursed tampon without departing from the invention. It should, therefore, be understood that the forms of the material, the steps of the method and the machines herein illustrated and described are intended to be illustrative only and not as limiting the scope of the appended claims.

I claim:

1. The method of producing a tampon from sheet-like absorbent material comprising pursing and forcing together the material which surrounds the central portion, heating the material, and causing relative movement of the pursed and heated material and a circumferentially spaced series of forming elements projecting radially inside of the outer surface of the pursed material for radially indenting and compressing the pursed marginal portions of the material sufficiently to impart a cylindrical to tapered form thereto and to render the product substantially shape retaining in character.

2. The method of producing a tampon from sheet-like absorbent material comprising pursing and forcing together the material which surrounds the central portion, thereafter simultaneously heating the material and radially indenting and compressing the pursed portion of the material along lines extending longitudinally of the tampon and spaced from each other circumferentially.

3. The method of producing a tampon from sheet-like absorbent material comprising securing a cord to the central portion of said sheet-like material, pursing and forcing together the portion of the material which surrounds the central portion, transversely compressing the pursed portion, and while the pursed portion is under compression pressing axially the cord bearing part of the central portion to form therein a shaped indentation to accommodate the fingernail of the user.

4. The method of producing a tampon from sheet-like absorbent material comprising pursing and forcing together the portion of the material which surrounds the central portion, transversely compressing the pursed portion, and while the pursed portion is under compression heating and applying further pressure to the free edges of the pursed portion to give a self-retaining substantially conical apex to the end.

5. The method of producing a tampon from sheet-like absorbent material comprising pursing and forcing together the portion of the material which surrounds the central portion, transversely compressing the pursed portion and while the pursed portion is under compression, applying pressure to the free edges of the pursed portion in opposed directions axially of the body to form a conical apex on the end of the pursed portion and an indentation on said central portion to accommodate the fingernail of the user.

6. The method of producing a tampon from sheet-like absorbent material, comprising pursing and forcing together the portion of the material which surrounds the central portion, heating the material, and thereafter radially compressing the heated pursed portion by the application of pressing members at spaced points around the circumference.

7. The method of producing a tampon comprising providing a piece of absorbent sheet-like soft absorbent material having a square to rectangular shape, looping a cord through the central portion of the material, pursing and bringing together on the side of the body having the looped portion of the cord the portion of the body surrounding the central portion, compressing laterally the pursed portion at spaced points around the circumference, compressing the corners into an apex, heating the body of material while it is being compressed to at least partially dehydrate the same, and wrapping the compressed material while in its shape retaining dehydrated condition.

8. A method of producing a tampon from sheet-like absorbent material which comprises pursing together a portion of the body which surrounds the central portion, retaining the material in pursed form by the application of a restraining force at spaced areas around the periphery of the pursed material, and indenting and compressing the material at points between said retained areas to form adjacent substantially uncompressed and absorbent lobes of material separated by compressed and indented retaining lines of the material.

9. A method of producing a tampon from sheet-like absorbent material which comprises pursing together a portion of the body which surrounds the central portion, retaining the material in pursed form and applying heat at spaced areas around the periphery of the pursed material, and indenting the pursed body and applying heat thereto at points between said retained areas.

10. A method of producing a tampon from sheet-like absorbent material which comprises pursing together a portion of the body which surrounds the central portion, retaining the material in pursed form by the application of restraining forces at spaced areas around the periphery of the pursed material, compressing the material radially at points between said retained areas, and forming an indentation in the bottom and an apex at the top of the pursed material by the application of longitudinal forces to the pursed material.

11. A method of producing a tampon from sheet-like absorbent material which comprises pursing together a portion of the body which surrounds the central portion, retaining the material in pursed form by the application of restraining forces at spaced areas around the periphery of the pursed material, heating the material in said areas, radially compressing and heating the material at spaced points between said retained areas, and forming an indentation in the bottom and an apex at the top while said material is being radially compressed and heated.

12. A method of producing a tampon from sheet-like absorbent material which comprises pursing together a portion of the body which surrounds the central portion, retaining the material in pursed form with elements spaced around the periphery, heating said material and compressing the material with elements applied at points between the retained areas.

13. A method of forming a tampon from sheet-like material which comprises pursing together the portion of the body which surrounds the central portion, thereafter radially indenting and compressing the pursed portion at spaced points around the circumference and maintaining it under compression while so indented, and heating the material while being maintained under said compression.

14. A method of forming a tampon from sheet-like material which comprises pursing together the portion of the body which surrounds the central portion, moving the pursed up body and progressively forming and indenting the pursed up body to produce radially extending flute-like undulations during said movement and confining the material while in such form so as to take on semi-shape retaining characteristics.

15. A method of forming a tampon from sheet-like material which comprises pursing together the portion of the body which surrounds the central portion, moving the pursed up body and progressively forming and indenting the pursed up body to produce radially extending flute-like undulations during said movement, confining said material under compressive forces extending radially throughout the length of said undulations, and heating the material while so confined.

16. A method of forming a tampon from sheet-like material which comprises pursing together the portion of the body which surrounds the central portion, moving the pursed up body in an axial direction past members extending transversely into the path of movement of the pursed up body to progressively compress the pursed up portions along lines contacted by such members during the movement, and heating the material while held in such compressed condition.

17. A machine for making tampons from sheet-like absorbent material comprising means to purse and fold together the portion of the material which surrounds the central portion and means engageable with the pursed material to radially compress and indent the pursed marginal portions of the material transversely at spaced points about the circumference thereof, the indenting portion of said means extending inside of the outer surface of the pursed material.

18. A machine for making tampons from sheet-like absorbent material comprising means to purse and fold together the portion of the material which surrounds the central portion, compression means having surfaces circumferentially disposed to engage and shape the pursed material, and members spaced apart and extending radially inward of the minimum circumference of said circumferentially disposed surfaces to compress and indent the material radially.

19. A machine for making tampons from sheet-like absorbent material comprising means to purse and fold together the portion of the material which surrounds the central portion, means to compress the pursed material radially with respect to the axis thereof, and means to press axially on said central portion to form therein an indentation to accommodate the fingernail of the user.

20. A machine for making tampons from sheet-like absorbent material comprising means to purse and fold together the portion of the material which surrounds the central portion, means to compress the pursed material radially with respect to the axis thereof, a hollow conical member, and means to force the conical member onto the end of the pursed portion to render it substantially conical.

21. A machine for making tampons from sheet-like material comprising means to purse and fold together the portion of the material which surrounds the central portion, a plurality of segments arranged circumferentially to confine said material in pursed form, and blades movable radially between said segments to compress the material.

22. A machine for making tampons from sheet-like material comprising means to purse and fold together the portion of the material which surrounds the central portion, a plurality of segments arranged circumferentially to confine said material in pursed form, and blades extending lengthwise of the pursed material and movable radially between said segments to compress the material at spaced points around the periphery thereof.

23. A machine for making tampons from sheet-like material comprising means to purse and fold together the portion of the material which surrounds the central portion, a plurality of segments arranged circumferentially to confine said material in pursed form, blades extending lengthwise of the pursed material and movable radially between said segments to compress the material along lines spaced at points around the periphery thereof, and means for heating said segments and said blades.

24. A machine for making tampons from sheet-like material comprising means to purse and fold together the portion of the material which surrounds the central portion, a tubular shaped confining means through which said pursed material may be moved axially, means extending into said tubular means to engage and indent said pursed material as it is moved relative thereto, and confining means aligned with said tubular means into which said shaped material may be moved to hold it in shaped form.

25. A machine for making tampons from sheet-like material comprising means to purse and fold together the portion of the material which surrounds the central portion, a tubular shaped confining means through which said pursed material may be moved axially, projections extending into said tubular means to engage and compress said pursed material as it is moved by said projections, and confining means having radially extending ribs to hold said material in such compressed condition.

26. A machine for making tampons from sheet-like material comprising means to purse and fold together the portion of the material which surrounds the central portion, a tubular shaped confining means through which said pursed material may be moved axially, rotatable discs extending through slots in said tubular means to engage and compress said pursed material as it is moved past said discs, confining means having radially extending ribs in alignment with said discs to hold said material in such compressed condition, and means to heat said confining means.

27. A method of producing a tampon from sheet-like absorbent material comprising assembling at least one layer of absorbent cotton and a layer of gauze, pursing up and forcing together the portions which surround the central portion of said assembled absorbent material with the absorbent cotton on the exterior to form folds in the layer of absorbent cotton and the layer of gauze which extends substantially uniformly around said pursed-up portion, heating said absorbent material in said pursed-up and folded form and radially compressing the same to form creases in the material which impart shape-retaining properties to the tampon solely as the result of such heating and compression.

WILLIAM H. RABELL.

REFERENCES CITED

The following references are of record in the file of this patent:

UNITED STATES PATENTS

| Number | Name | Date |
|---|---|---|
| 2,263,909 | Webb | Nov. 25, 1941 |
| 1,964,911 | Haas | July 3, 1934 |
| 2,188,923 | Robinson | Feb. 6, 1940 |
| 2,058,275 | Voss | Oct. 20, 1936 |
| 2,286,817 | Knight | June 16, 1942 |
| 2,306,406 | Robinson | Dec. 29, 1942 |